United States Patent
Ramberg

[11] 3,790,267
[45] Feb. 5, 1974

[54] OPTICAL SYSTEM FOR ORTHOGONALIZING IMAGE FIELD OF PROJECTION LENS

[75] Inventor: Edward G. Ramberg, Southampton, Pa.

[73] Assignee: RCA Corporation, New York, N.Y.

[22] Filed: July 14, 1972

[21] Appl. No.: 271,934

Related U.S. Application Data

[63] Continuation of Ser. No. 17,412, March 9, 1970, abandoned.

[52] U.S. Cl. .................... 353/70, 350/161, 350/286, 353/81
[51] Int. Cl. ... G03b 21/00, G03b 21/14, G02f 1/30
[58] Field of Search ............. 353/44, 45, 69, 70, 81; 350/168, 286, 161, 202, 182

[56] References Cited
UNITED STATES PATENTS

| | | | |
|---|---|---|---|
| 3,269,258 | 8/1966 | Byrd et al. | 353/45 |
| 3,497,289 | 2/1970 | Oberleuser | 350/185 |
| 3,551,029 | 12/1970 | Kirchloff | 350/185 |

Primary Examiner—Louis R. Prince
Assistant Examiner—Steven L. Stephan
Attorney, Agent, or Firm—Eugene M. Whitacre; William H. Meagher

[57] ABSTRACT

Light from an unmodulated source is collimated and angularly directed to a target reflecting surface which is deformable to represent a subject and from which it is directed by a schlieren projection system including a projection lens and a stop at the focal point of the lens for the subject representative light which is angularly reflected from the target surface. A prism is placed between the target and the projection lens to effectively render the image represented by the principal light rays reflected from the target substantially orthogonal to the principal plane of the lens. For monochromatic light a simple triangular prism is used and for polychromatic or white light a compound prism of trapezoidal shape and comprising at least two components with different indices of refraction is used. A preferred form of the compound prism is of trapezoidal shape and comprises three components, two of the components having a third component having a different index of refraction. In one of the three-part compound prisms the components are of glass materials and in another form of such a prism the components are of optical plastic materials.

11 Claims, 6 Drawing Figures

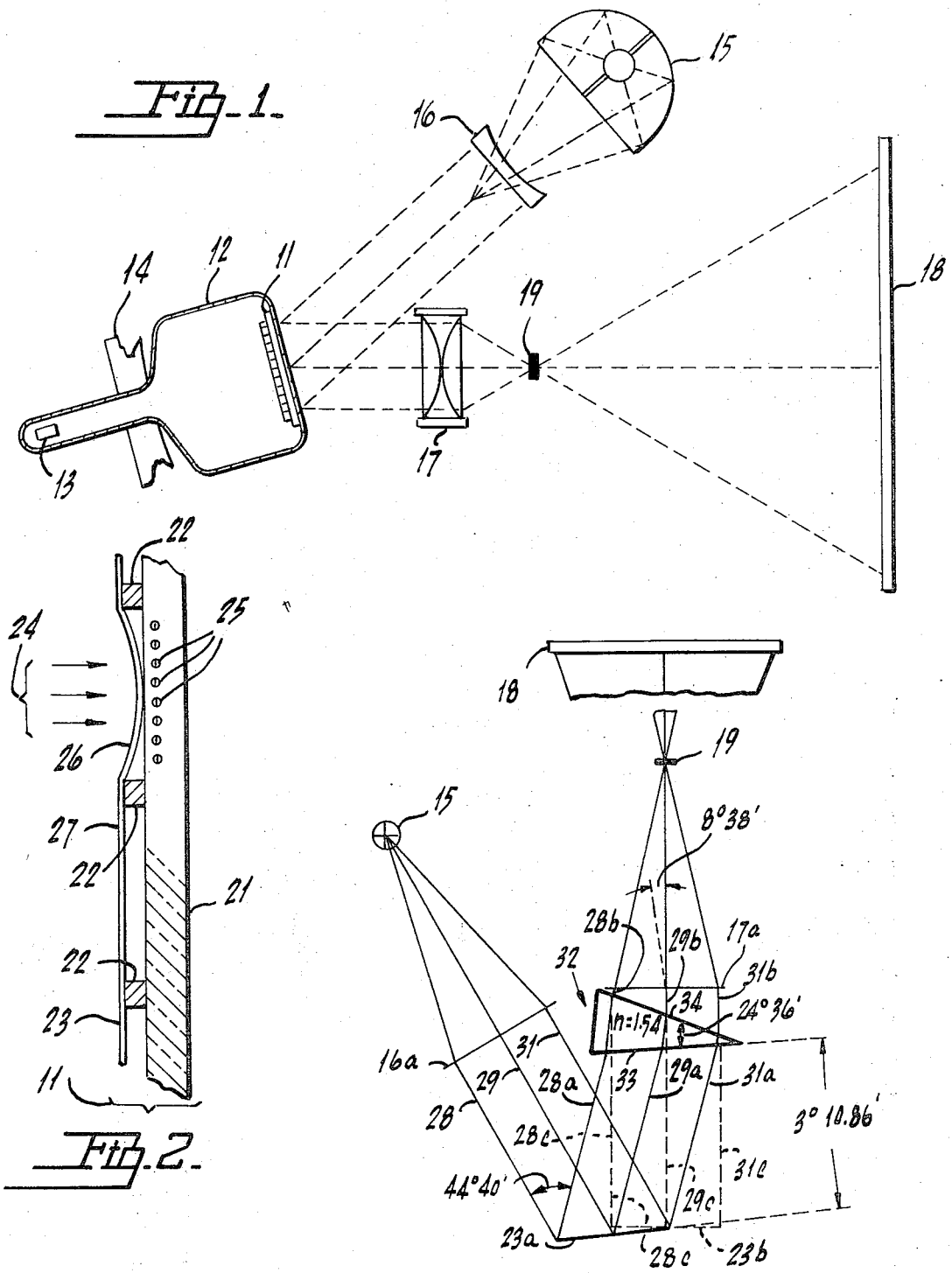

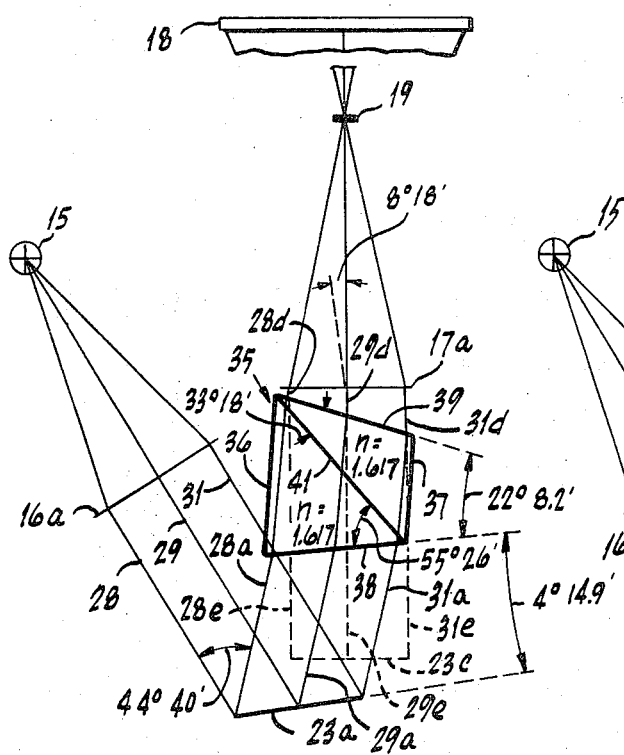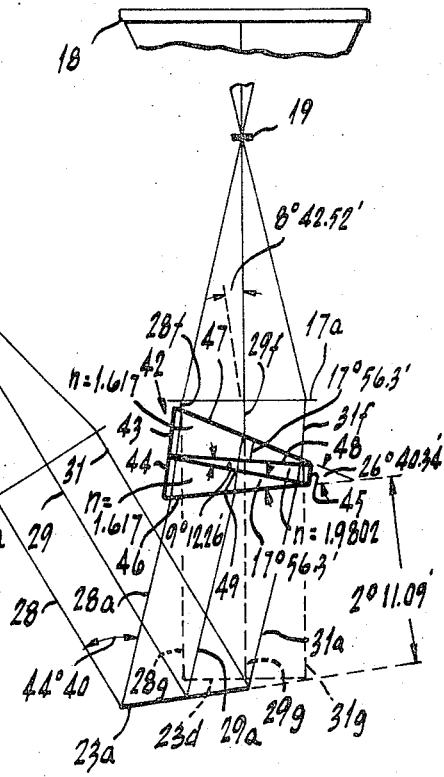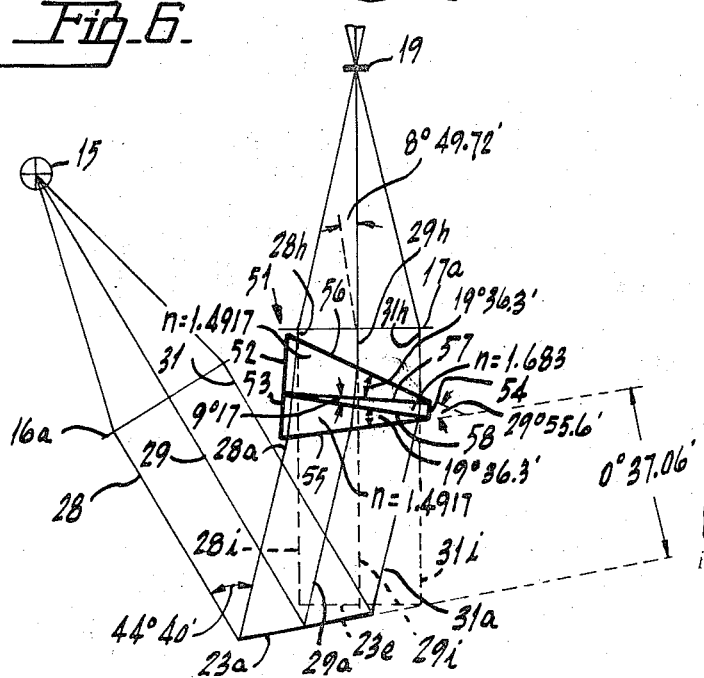

OPTICAL SYSTEM FOR ORTHOGONALIZING IMAGE FIELD OF PROJECTION LENS

This application is a continuation of Ser. No. 17,412, filed Mar. 9, 1970, now abandoned.

OPTICAL SYSTEM FOR ORTHOGONALIZING IMAGE FIELD OF PROJECTION LENS

In the projection of images by schlieren optical systems, two general arrangements usually have been employed in the past. In one arrangement, a single lens has been used to perform (1) the function of collimating the light which is directed onto the reflective surface which is deformable to a small degree and in different amounts to reflectively deviate the impinging light rays so as to represent a subject and (2) the function of projecting the reflected light toward a viewing screen. In such an arrangement, a stop is placed at the focal point of such a lens so as to prevent any undeviated light rays received from the reflecting surface from reaching the viewing screen. While, in this arrangement, the principal reflected light rays are substantially orthogonal to the principal plane of the lens and to the viewing screen and the definition of the projected image is satisfactory, the contrast of the image tends to be undesirably reduced by unwanted light which is reflected toward the screen by the single lens serving both as collimator and as projector.

In the other previously used arrangement, separate collimator and projector lenses have been employed. In this type of arrangement, the collimated and projected light beams necessarily are at angles to the reflecting surface which is deformed to represent the subject. While such an arrangement can produce a projected image having relatively high contrast, it is one in which the image field undesirably deviates from orthogonality to the axis of the imaging light beam. Therefore, the simultaneous requirements of satisfactory imaging of the light source on the schlieren stop and of producing good optical quality (i.e., low abberations) of the projected image can only be satisfied for relatively small optical apertures and, consequently, the image projected onto the viewing screen has an unsatisfactorily low brightness.

If, in order to obtain adequate brightness of an image projected onto a flat viewing screen, relatively large apertures are used in a two-lens system, the deviation from orthogonality of the reflected light rays on the screen produces, apart from a keystone distortion of the image, a degrading variation of the resolution of the projected image. Heretofore, various measures have been adopted to mitigate to some degree one or both of such defects. One expedient was to predistort the dimensions of the image to be projected so as to compensate for the expected keystoning. Such an approach requires circuit modifications which not only add to the cost of the equipment but also produce other undesired image degradation. Another technique which has been employed is to effect the compensation by means of a fiber-optic combination prism. Such apparatus necessarily is quite complicated and cumbersome in addition to being costly. Third suggested compensation device is that disclosed in U. S. Pat. No. 3,249,004, issued May 3, 1966 to O. A. Ullrich, which comprises two glass blocks located in the projected light path, serving to produce a rough depth-of-field compensation. Not only is the compensation afforded by such means too crude for the relatively high degree of resolution needed for the projection of good quality television images but also unwanted lines, produced by the junction of one block with another, may appear in the projected image on the viewing screen.

It is an object of this invention, therefore, to provide improved means for effecting depth-of-field correction in an off-axis optical projection system which has none of the deficiencies of prior art compensators of the character described.

The present invention is embodied in a schlieren type of projection system in which collimated light is directed at an angle to a reflecting surface on which a subject is recorded in the form of deformations of the surface and from which modulated light representing the subject is reflected at an angle to the surface. The subject-modulated light is directed by a projection lens toward a viewing screen which is substantially parallel to the principal plane of the lens. A prism is located between the subject-bearing surface and the projecting lens in the path of the reflected light and has such configuration, refractive index and angular relation to the reflected light path as to bend the beam of reflected light toward the normal to the plane of the subject so that it is substantially orthogonal to the principal plane of the projecting lens and, thus, is aligned with the axis of this lens. In a presently preferred form of the invention the prism is located adjacent the principal plane of the projecting lens. For monochromatic light a single component prism having a triangular shape is used with its vertex angle on the side of the projecting lens axis opposite to the one on which the beam of collimated light is located. For polychromatic, such as white, light the prism is a unitary composite structure, the plurality of components of which are bonded together with their respective vertex angles on both sides of the projecting lens axis so that the structure has a trapezoidal shape.

For a more specific disclosure of the invention reference may be had to the following detailed description of a number of illustrative embodiments thereof which is given in conjunction with the accompanying drawings, of which:

FIG. 1 is a diagrammatic representation of one type of image projection system in which the apparatus may be used;

FIG. 2 is a fragmentary view, to a grossly enlarged scale, of an electrode of the system of FIG. 1 on which the subject whose image is to be projected is recorded;

FIG. 3 is a diagrammatic representation of an optical system embodying the invention indicating the use of a simple prism for monochromatic light;

FIG. 4 is a diagrammatic representation of another embodiment of the invention in an optical system using a two-part composite prism for polychromatic light;

FIG. 5 is a diagrammatic representation of another form of the invention in which the optical system includes a three-part composite prism, the components of which are glass, for use with polychromatic light; and FIG. 6 is a diagrammatic representation of a form of the invention similar to that of FIG. 5 but in which the prism components are of plastic materials.

FIG. 1 shows a general type of image formation and projection system in which the invention may be used. In this case the subject, representing the image to be projected, is formed on a light-reflecting target electrode 11 of a cathode ray tube 12 by a video signal-modulated electron beam produced by a gun 13 and deflected over the target electrode by means including a deflection yoke 14 energized in a conventional manner to scan a raster at the electrode 11. Light from a source 15 is directed by means including a collimating lens 16 at an angle to the surface of the target electrode form which it is reflected in image-representative form and directed by means including a projecting lens 17 to a viewing screen 18. The particular image-projecting system shown to illustrate the invention is of the schlieren type which has a stop located substantially at the focal point of the projecting lens 17.

The target electrode 11 of the cathode ray tube 12 is effectively a part of a light valve of the type disclosed in a copending application of John A. van Raalte and Victor Christiano, filed Sept. 29, 1969 and entitled "Intelligence-Handling Device Having Means for Limiting Induced Electrostatic Potential." Essentially, as shown in FIG. 2, the target electrode 11 comprises an insulating substrate 21, such as glass (which conveniently may be the faceplate of the cathode ray tube) on one plane surface of which there are a plurality of supporting conductors 22 which are electrically connected together (not shown). The spacing between adjacent conductors corresponds to the dimensions of an elemental area of the subject to be effectively recorded on the electrode. The conductors 22 support, in spaced relation to the substrate 21, a light-reflective, electrostatically deformable, normally flat metal film 23 which may be made of alloys of metals such as nickel, copper or aluminum, for example. The film 23 is sufficiently thin to be pervious to an electron beam 24 so that a pattern of electrical charges 25 may be produced on the substrate 21, the particular pattern being determined by the intensity of the video signal modulation of the electron beam. The electrostatic potential so produced between the film 23 and the substrate 21 effects a local deformation of an elemental area 26 of the film 23. An elemental area 27 of the film 23 behind which no electrical charges are produced on the insulating substrate 21 remains flat and undeformed.

Again referring to FIG. 1, any light which is reflected from an undeformed elemental area of the metal film of the target electrode 11 of the cathode ray tube 12 is intercepted by the schlieren stop 19 and, hence, does not reach the screen 18, thereby producing a dark spot at the part of the projected image corresponding in location to that of the undeformed part of the target electrode film. At lease some of the light which is reflected from a deformed elemental area of the target electrode film, however, is not intercepted by the stop 19 and, hence, does reach the screen 18 to produce light of an intensity depending upon the amount of film deformation at the part of the projected image which corresponds to the location of the deformed area of the film in the recorded subject. The more intense the electron beam is at a given elemental area of the film the greater will be the film deformation and the greater amount of the light from the source 15 that will be reflected to the screen 18. In this way a reproduction of the subject recorded at the target electrode 11 of the cathode ray tube 12 is projected to the viewing screen 18. As previously stated, however, such a reproduction will be subject to such deficiencies as unsatisfactorily low brightness, keystone distortion and the like unless steps are taken to compensate for the necessarily non-orthogonality of the reflected light rays relative to the principal plane of the projecting lens 17.

In the following discussion of a number of embodiments of the invention reference characters with different subscripts will be used to designate corresponding elements in the several figures. Also, it will be understood that the specified materials, dimensions and configurations of the plurality of embodiments of the invention are based on calculations formulated from certain assumed conditions and such embodiments have been found to operate satisfactorily substantially in the manner indicated by the calculated data. In order to avoid undue complication of the specification, the mathematical calculations will not be included but only the essential information regarding the resultant structures will be given.

In all of the illustrative embodiments of the invention to be described in detail presently it is assumed that, for the basis of the mathematical calculations, the reflective target electrode 11 of FIG. 1, which includes the deformable reflective film 23 of FIG. 2, has a width of 2 inches in the direction in which it is scanned horizontally by the electron beam and the light emanating from the source 15 has a width of 0.2 inches. An $f/2$ optical projecting system also is assumed with a projecting lens-to-screen distance which is large compared to an assumed 4 inch focal length of the lens, such length also being equal to the distance between the target electrode and the principal plane of the projecting lens. In order to achieve full modulation with no vignetting in such a system, the light source image should be displaced beyond the stop 19 of FIG. 1. This requires that the projecting lens 17 have a minimum diameter of 3.28 inches. By considering the collimating and projecting lenses 16 and 17 respectively as thin lenses concentrated in their respective principal planes the calculated minimum value of the incident angle at which the light from the source 15 impinges upon the plane of the target electrode is 22° 20 min. Thus, the angle between a principal impinging ray and its reflected counterpart from an undistorted (i.e., flat) elemental area of the target film 23 is 44° 40 min. (i.e., twice the incident angle).

In FIG. 3 it is assumed that the source of light 15 is monochromatic and is angularly directed by a collimating lens, having its principal plane represented by the line 16a, toward the reflecting film 23a which may be part of the target electrode 11 of the cathode ray tube 12 of FIG. 1. The angle at which the collimated monochromatic light is directed toward the film 23a, on which a subject is recorded in the manner described, is such that typical principal light rays 28, 29 and 31 are reflected from undeformed areas of the film respectively as rays 28a, 29a and 31a, the angles between corresponding original and reflected rays being 44° 40 min. as previously explained. In this embodiment of the invention a single prism 32 of ordinary crown glass, having an index of refraction $n$ which is substantially 1.54 and a vertex angle between its entrance and exit surfaces 33 and 34 respectively of approximately 24° 36 min., is located adjacent the principal plane 17a of the projecting lens. The orientation of the prism 32 is such that it entrance surface 33 is at an angle of 3° and 10.86 minutes relative to the plane of the reflecting film 23a. In such apparatus the reflected principal rays 28a, 29a and 31a which impinge upon the entrance surface 33 of the prism 32 leave the exit surface 34 as rays 28b, 29b and 31b respectively which are orthogonal to the principal plane 17a of the projecting lens which, therefore, functions to accurately project the recorded subject as if it were located in the plane 23b and typical principal light rays 28c, 29c and 31c were emanating therefrom orthogonally to the projecting lens plane 17a. As indicated in FIG. 3 the principal light rays, such as the ray 29b, leave the exit surface 34 of the prism 32 at an angle of 8° 38 min. relative to the normal to the target plane 23a which effectively is the angle between the real target plane 23a and the apparent target plane 23b produced by the operation of the prism 32.

The single prism 32 of FIG. 3 is generally unsatisfactory for polychromatic light, such as white light, because the image displacement is a function of wavelength and, hence, undesired color fringes would be present in the image projected onto the viewing screen 18. For white light, therefore, an achromatic prism is required so as to impart practically constant angular deflection of the principal rays for all wavelengths of the visible spectrum.

FIG. 4 shows one such two-part achromatic prism 35 which is a unitary composite device comprising two triangular components 36 and 37 having an entrance surface 38, an exit surface 39 and an interface 41. The component 36 is of dense barium crown glass having a median index of refraction n of 1.617 and a vertex angle between the entrance surface 38 and the interface 41 of 55° 26 min. The component 37 is of dense flint glass having a median index of refraction n of 1.617 and a vertex angle between the exit surface 39 and the interface 41 of 33° 18 min. The two prism components 36 and 37 are bonded together at the interface 41 with their respective vertex angles on opposite sides of the optical axis of the projecting lens 17 so that the composite prism has a trapezoidal configuration and an overall angle of 22° 8.2 min. between its entrance and exit surface 38 and 39 respectively. The described achromatic prism 35 is located adjacent the principal plane 17a of the projecting lens with its entrance surface 38 at an angle of 4° 14.9 min. relative to the plane of the reflecting film 23a so that the principal reflected rays 28a, 29a and 31a which impinge upon the entrance surface 38 leave the exist surface 39 of the prism 35 as rays 28d, 29d and 31d respectively which have the desired orthogonality to the principal projecting lens plane 17a. As in the previously described embodiment of the invention this lens projects the rays 28d, 29d and 31d, which leave the exit surface 39 at an angle of 8° 18 min. relative to the normal to the target plane 23a, as if they had orginated as rays 28e, 29e and 31e in a reflecting plane 23c.

One difficulty with a two-part achromatic prism such as that of FIG. 4 is its thickness which is so great that, even when the prism 35 is mounted as close as possible to the principal plane 17a of the projecting lens, it interferes to some extent with at least part of the collimated light beam by which the target 23a is illuminated.

FIG. 5 depicts a three-part composite prism 42 embodying the invention which may be used when the source 15 is one of white light and is such a prism that does not interfere with the beam of collimated light including the rays 28, 29 and 31 with which the target 23a is illuminated. This prism is a unitary composite device comprising two substantially triangular components 43 and 44 between which a third triangular component 45 is sandwiched. The first and second components 43 and 44 are of dense barium crown glass each having a median index of refraction n of 1.617 and a vertex angle of 17° 56.3 min. The third component 45 is of phosphate flint glass having a median index of refraction n of 1.9802 and a vertex angle of 9° 12.26 min. The three components of the prism 42 are assembled with the vertex angles of the first and second components 43 and 44 on one side (the right as viewed in the drawing) and with the vertex angle of the third component 45 on the other (left) side of the optical axis of the projecting lens 17. Thus, the composite prism 42 has a trapezoidal shape with an overall angle of 26° 40.34 min. between its entrance surface 46 and its exit surface 47. The three prism components are bonded together so that the two surfaces of the sandwiched third component 45 form interfaces 48 and 49 respectively with one surface each of the first and second components 43 and 44. With the prism 42 located adjacent the principal plane 17a of the projecting lens so that its entrance surface 46 is at an angle of 2° 11.09 min. relative to the plane of the reflecting film 23a the typical principal rays 28f, 29f and 31f emerge from the exit surface 47 orthogonally to the principal projecting lens plane 17a as if they were rays 28g, 29g and 31g emanating from an apparent reflecting plane 23d having an angular relationship to the real film plane 23a of 8° 42.52 min. This, also, is the indicated angle that the rays 28f, 29f and 31f make with the normal to the reflecting target film plane 23a.

A somewhat lower cost orthogonalizing prism embodying the invention may be made by the use of suitable plastic materials. FIG. 6 shows such a three-part composite prism 51. This prism also is a unitary composite device comprising first and second substantially identical triangular components 52 and 53 which effectively sandwich between them a third triangular component 54. The first and second components 52 and 53 are of methyl methacrylate which has a mean index of refraction n of 1.4917 and a vertex angle of 19° 36.3 min. The third component 54 is of vinyl carbazole having a mean index of refraction n of 1.683 and a vertex angle of 9° 17 min. The three components of the prism 51 are assembled in a manner similar to the components of the glass prism 42 of FIG. 5 with the vertex angles of the components 52 and 53 on one side of the optical axis of the projecting lens 17 and the vertex angle of the component 54 on the other side of the axis. In such an assembly the composite prism 51 has a trapezoidal shape with an overall angle of 29° 55.6 min. between its entrance surface 55 and its exit surface 56. When the prism components are bonded together as shown the two surfaces of the sandwiched third component 54 form interfaces 57 and 58 respectively with one surface each of the first and second components 52 and 53. With the prism 51 located adjacent the principal plane 17a of the projecting lens in a position such that its entrance surface 55 is at an angle of 0° 37.06 min. relative to the target film plane 23a and the rays 28h, 29h and 31h emanating from the exit surface 56 of the prism are orthogonal to the principal plane 17a of the projecting lens and at an angle of 8° 49.72 min. relative to the normal to the subject-bearing plane 23a. These rays thus, appear as if they were rays 28i, 29i and 31i originating at an apparent reflecting plane 23e located at an angle of 8° 49.72 min. relative to the real reflecting plane 23a.

What is claimed is:

1. An optical system for projecting an image of a subject having an effective principal plane onto a viewing screen angularly disposed relative to the effective principal plane of said subject, comprising:

a source of light;

means including a collimating lens for directing light from said source angularly onto said subject;

means including a projecting lens having its principal plane substantially parallel to the plane of said screen and angularly disposed relative to the effective principal plane of said subject for receiving light angularly reflected from said subject and directing it to said screen; and means for substantially orthogonalizing said reflected light relative to the principal plane of said projecting lens, said orthogonalizing means comprising a prism located in the path of said reflected light between said subject and said projecting lens, said prism having a rear planar surface through which said reflected light enters and a front planar surface through which said reflected light exits, said rear surface being oriented to be angularly disposed relative to the principal plane of said projecting lens, and said front planar surface being angularly disposed relative to the principal plane of said projecting lens as well as angularly disposed relative to the plane of said rear prism surface, the planes of said front and rear prism surfaces converging at a location shifted from the optical axis of said projecting lens in the same direction as the location at which the plane of said rear prism surface intersects the principal plane of said projecting lens, the angular orientation of said prism being thus chosen to minimize astigmatism effects produced by said prism in said projected image.

2. An optical system for projecting an image of an illuminated subject having an effective principal plane onto a viewing screen angularly disposed relative to the effective principal plane of said subject, comprising:

means including a projecting lens having its principal plane substantially parallel to the plane of said screen and angularly disposed relative to the effective principal plane of said subject for receiving light from said illuminated subject and directing it to said screen; and means for substantially orthogonalizing said reflected light relative to the principal plane of said projecting lens;

said orthogonalizing means comprising a prism located in the light path between said subject and said projecting lens, said prism having a rear planar surface through which light enters and a front planar surface through which light exits, said rear surface being oriented to be angularly disposed relative to the principal plane of said projecting lens, and said front planar surface being angularly disposed relative to the principal plane of said projecting lens as well as angularly disposed relative to the plane of said rear prism surface, the planes of said front and rear prism surfaces converging at a location shifted from the optical axis of said projecting lens in the same direction as the location at which the plane of said rear prism surface intersects the principal plane of said projecting lens, and the location at which the principal plane of said projecting lens intersects the effective principal plane of said subject;

the angular orientation of said prism being thus chosen to minimize astigmatism effects produced by said prism in said projected image.

3. An optical system for projecting an image of a subject having an effective principal plane onto a viewing screen angularly disposed relative to the effective principal plane of said subject, comprising:

a source of light;

means including a collimating lens for directing light from said source angularly onto said subject;

means including a projecting lens having its principal plane substantially parallel to the plane of said screen and angularly disposed relative to the effective principal plane of said subject for receiving light angularly reflected from said subject and directing it to said screen; and means for substantially orthogonalizing said reflected light relative to the principal plane of said projecting lens, said orthogonalizing means comprising a prism located in the path of said reflected light between said subject and said projecting lens, said prism having a rear planar surface through which said reflected light enters and a front planar surface through which said reflected light exits, said rear surface being oriented to be angularly disposed relative to the principal plane of said projecting lens, and said front planar surface being angularly disposed relative to the principal plane of said projecting lens as well as angularly disposed relative to the plane of said rear prism surface, the planes of said front and rear prism surfaces converging at a location shifted from the optical axis of said projecting lens in the same direction as the location at which the plane of said rear prism surface intersects the principal plane of said projecting lens;

said prism being located adjacent the principal plane of said projecting lens and remote from said subject such that all portions of said rear prism surface are separated from said subject by a distance corresponding to a significant portion of the length of said light path between said subject and said projecting lens, and said rear prism surface is provided with a dimension exceeding the corresponding dimension of said subject so as to accommodate divergent light rays reflected from said subject.

4. An optical system as defined in claim 3, wherein:

said source of light is substantially monochromatic; and said prism comprises a single wedge-shaped component having a planar surface of triangular shape normal to the planes of said light entrance and exit surfaces.

5. An optical system as defined in claim 3, wherein:

said source of light is polychromatic; and said prism is a unitary composite structure having a planar surface of trapezoidal configuration normal to the planes of said light entrance and exit surfaces comprising two wedge-shaped components of different materials both having the same median index of refraction and bonded together at an interface with their respectively different vertex angles being on opposite sides of the optical axis of said projecting lens and having said interface as a common side.

6. An optical system as defined in claim 3, wherein:

said source of light is substantially white; and said prism is a unitary composite structure having a planar surface of trapezoidal configuration normal to the planes of said light entrance and exit surfaces comprising three wedge-shaped components, first and second ones of said components being of the same material with the same median index of refraction and substantially identical vertex angles, and the third one of said components being of a different material with a different median index of refraction and a different vertex angle, said components being bonded together at two interfaces with the vertex angles of said first and second components being on one side of said projecting lens axis and the vertex angle of said third component being on the other side of said projecting lens axis, said interfaces respectively including opposite sides of the vertex angle of said third component and one side of each of the vertex angles of said first and second components.

7. An optical system as defined in claim 6, wherein: said first, second and third prism components are of glass materials.

8. An optical system as defined in claim 7, wherein: said first and second prism components are of dense barium crown glass and said third prism component is of dense phosphate flint glass.

9. An optical system as defined in claim 6, wherein: said first, second and third prism components are of optical plastic materials.

10. An optical system as defined in claim 9, wherein: said first and second prism components are of methyl methacrylate and said third prism component is of vinyl carbazole.

11. An optical system as defined in claim 3, wherein: said source is polychromatic; and said prism is a unitary composite structure having a planar surface of trapezoidal configuration normal to the planes of said light entrance and exit surfaces comprising several wedge-shaped components with refractive indices, dispersions and vertex angles so chosen that the deflection imparted to the light rays incident on the prism is substantially independent of wavelength.

* * * * *